Jan. 30, 1962 W. W. WHITE 3,018,952
DIGITAL INDICATOR AND DECIMAL POINT INDICATING MEANS
Filed Nov. 23, 1955 2 Sheets-Sheet 1
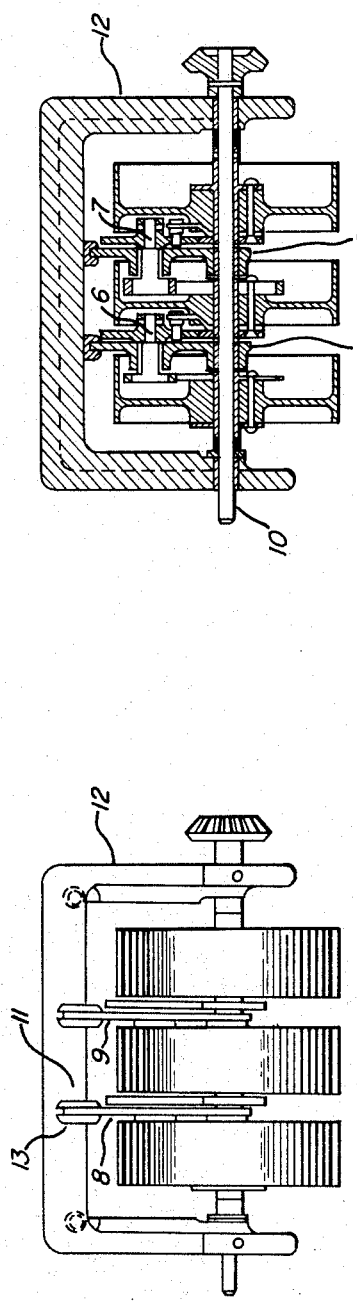
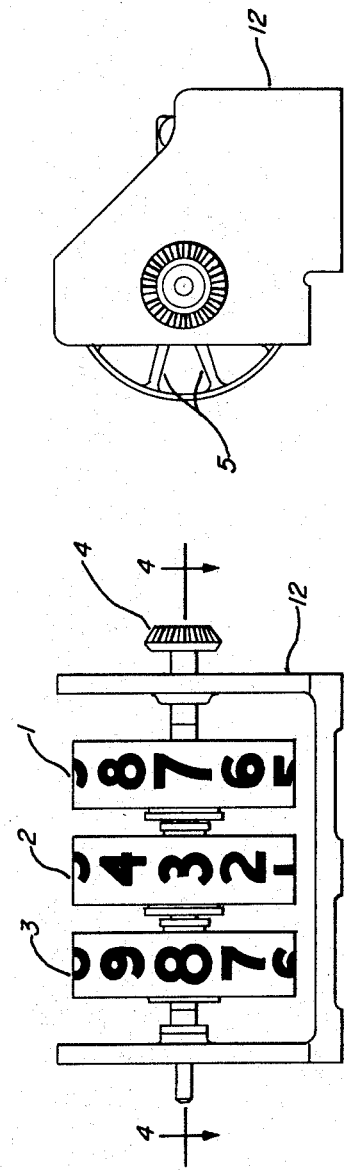
WARREN W. WHITE
INVENTOR
BY
ATTORNEY Jan. 30, 1962 W. W. WHITE 3,018,952
DIGITAL INDICATOR AND DECIMAL POINT INDICATING MEANS
Filed Nov. 23, 1955 2 Sheets-Sheet 2
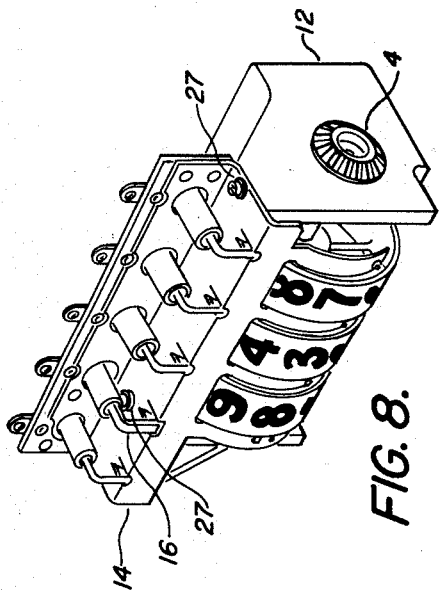
FIG. 8.
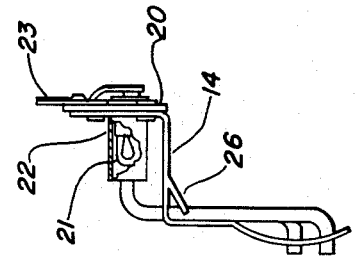
FIG. 6.
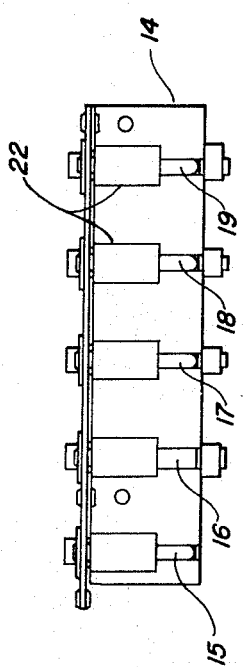
FIG. 7.
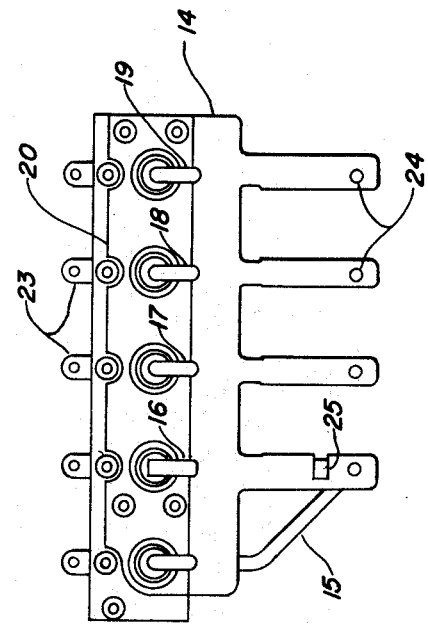
FIG. 5.
WARREN W. WHITE
INVENTOR
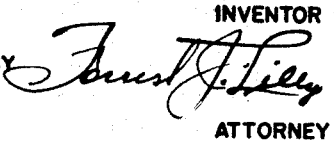
ATTORNEY United States Patent Office 3,018,952
Patented Jan. 30, 1962

3,018,952
DIGITAL INDICATOR AND DECIMAL POINT
INDICATING MEANS
Warren W. White, Sierra Madre, Calif., assignor, by
mesne assignments, to Motec Industries, Inc., Hopkins,
Minn., a corporation of Minnesota
Filed Nov. 23, 1955, Ser. No. 548,705
7 Claims. (Cl. 235—117)

The present invention relates generally to digital indicating devices and more particularly to a digital indicator having decimal point indicating means, in which a clear and accurate numerical display can be provided.

Digital counters having a plurality of digit indicating wheels usually provided identical units, tens, hundreds, etc. wheels. A decimal point indication can be provided by distinguishing the lowest order wheel by color, for example. This, of course, provides only a fixed decimal point indication accurate to tenths of a unit.

In addition, the usual mechanical counter has no provision for indicating a negative quantity although the magnitude may be correctly indicated.

It is an object of this invention to provide a digital indicator in which multiple decimal points are available for various numerical ranges of readings.

Another object of the invention is to provide a digital indicator having a negative sign indication.

A further object of the invention is to provide a new and novel digital indicator structure wherein a clear and visually undistorted numerical indication is accurately produced.

The foregoing and other objects are preferably accomplished, in short, by providing a mechanical counter having relatively large digit drums or wheels so that clearly viewed numerals are presented. These wheels are spaced axially apart each from the other to permit the insertion of a series of light conducting members therebetween, the end points thereof presenting a series of decimal points and a negative sign. These light conducting members are supported in a structure affixed to the counter and having light shielding support arms for the light conducting members. These arms are designed to support end sections of the light conducting members and are shaped to shield outward radiation of light from all portions of the conducting members except at the visible end points thereof. A plurality of lamps are suitably mounted on the support structure at the other ends of the light conducting members to provide illumination (light) which is transmitted by the conducting members.

The invention possesses other objects and features, some of which together with the foregoing will be set forth in the following description of a preferred embodiment of the invention, and the invention will be more fully understood by reference to the following attached drawings, in which:

FIGURE 1 is a front, elevation view of a preferred mechanical counter embodiment according to this invention.

FIGURE 2 is a side, elevation view of the counter of FIGURE 1.

FIGURE 3 is a top, plan view of the counter of FIGURE 1.

FIGURE 4 is a cross sectional view taken along the line 4—4 of FIGURE 1 illustrating constructing details of the counter.

FIGURE 5 is a front, elevation view of a preferred support structure for the light conducting members.

FIGURE 6 is a side, elevation view of the support structure of FIGURE 5.

FIGURE 7 is a top, plan view of the support structure of FIGURE 5.

FIGURE 8 is a perspective of a preferred embodiment of the digital indicator.

Referring first to FIGURE 1, there is shown a three stage decimal counter having a first order digit wheel 1, a second order digit wheel 2 and a third order digit wheel 3. These three wheels are geared conventionally and connected together as in the usual mechanical counter of this type, and is driven through pinion 4. The wheel 2 can make one revolution for every ten revolutions of wheel 1 and wheel 3 similarly can make one revolution for every ten revolutions on the wheel 2. The distinctive feature of this counter is in the large diameter wheels which are employed. Large and clear numbers can be presented by a large diameter wheel.

Space requirements for the counter are reduced by locating the axles for the usual Geneva movements within the periphery of the wheels. This will permit the use of large diameter wheels in a comparative small space. The diameter of the wheels is clearly observed to be large in FIGURE 2 and spokes 5 are used to connect wheel flange and hub.

Referring now to FIGURES 3 and 4, journals for the axles 6 and 7 of the Geneva movements are provided by bearing members 8 and 9, respectively. One end of bearing member 8, for example, is journalled as shown on shaft 10 which is freely rotatable therein. The other end of bearing member 8 is cut with an open ended slot to fit the shelf portion 11 of counter base member 12. A grommet 13, cut open to accept the shelf portion 11 provides a resilient support for this end of bearing member 8 and permits high speed rotation of the counter wheels. Bearing member 9 is similarly supported.

Reference is made jointly to FIGURES 5, 6 and 7 in which a support structure 14 is shown mounting light conducting members 15, 16, 17, 18 and 19. These light conducting members are preferably made of light conducting plastic material such as clear Lucite rods or tubes, for example. The structure 14 is fabricated of sheet metal, cut and formed to the configuration illustrated. Generally, the structure 14 is a doubly bent, at 90 degrees, sheet which is most clearly shown in FIGURE 6. An insulating panel 20 is riveted to the upper, vertical portion of structure 14 and mounts five lamps 21 inside open ended cylindrical shields 22. Terminals 23 are provided to connect power wires thereto for illuminating the lamps 21.

The lower, vertical portion of structure 14 is divided into four extended strips or arms most clearly illustrated in FIGURE 5 and may be slightly curved (FIGURE 6) to conform with the diameter of the digit wheels of the counter. Four round holes 24 are punched near the ends of the strips and in addition, a rectangular slot 25 is cut in the left strip as shown in FIGURE 5. On the horizontal portion of structure 14, five tabs 26 are produced by suitably cutting the structure 14 and bending the centers angularly down. One of the tabs is cut wider to accommodate the rectangular cross sectional light conducting member 16. The light conducting members are generally bent as indicated in FIGURE 6 such that one end will be positioned inside a cylindrical shield 22 and the other end will protrude through a hole 24. The light conducting member 16 fits directly below within the slot 25 whereas the light conducting member 15 must be additionally twisted such that an end will be aligned with the hole 24 in the left strip. These lower ends can be cemented at the holes to position the light conducting members firmly. The ends of tabs 26 are firmly braced against the light conducting members by the springing action of the tabs 26. This substantially holds and locks the light conducting members in place.

FIGURE 8 is a perspective of the complete digital indicator. The support structure 14 is fastened to the counter base member 12 by two screws 27. The ends of the light conducting members provide decimal points for four locations and cover the points before and after any digit. The rectangular end of light conducting member 16 in addition yields a negative sign indication for a reading. The strips, or arms, of structure 14 expose only the ends of the light conducting members, and numbers in line with the decimal points provide readings of the mechanical input on pinion 4 and may represent voltage, resistance, etc. measurements, for example. The lamps 21 are controlled externally by auxiliary means.

Thus, there is provided an exceptionally compact, high speed digital indicator in which a large and clear numerical display can be exhibited and multiple decimal points are available for various ranges of indication as well as negative sign indication.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect. The invention is, therefore, claimed in any of its forms or modifications within the legitimate and valid scope of the appended claims.

What is claimed is:

1. A digital indicator comprising a digital mechanical counter including a base having a front side and a plurality of coaxial, axially spaced digit wheels on the base having peripheral portions exposed to view at the front side of the base for registering a multi-digit number, a support member fixed to the base and extending axially across said wheels, said member having a flange parallel to the axis of said wheels and a row of openings closely adjacent said flange which are approximately aligned with the spaces between said digit wheels, respectively, a light conducting rod extending through each opening and into the space between the adjacent digit wheels, the ends of said rods within said spaces being located adjacent the peripheries of the wheels and having end faces presented to view at said side of the base in positions corresponding, respectively, to different decimal point positions in the number registered by the digit wheels, a spring tab on said member adjacent each opening engaging the adjacent rod to yieldably urge the latter against said flange whereby said rods are frictionally secured to the member, and a lamp opposite the other end of each rod for illuminating said end face of the respective rod.

2. The subject matter of claim 1 wherein said support member comprises a sheet metal piece having said tabs integrally therewith by punching the tabs from the piece to form said openings.

3. The subject matter of claim 1 wherein said edge of the support member is adjacent said front side of the base and extends toward said exposed portions of the digit wheels, and light shielding arms integral with the flange and extending in front of said rods, respectively.

4. The subject matter of claim 3 wherein said arms are curved to conform to the curvature of and are substantially flush with the peripheries of the digit wheels, each arm having a hole at its end receiving the first-mentioned end of the adjacent rod.

5. A digital indicator comprising a digital mechanical counter including a base having a front side and a plurality of coaxial, axially spaced digit wheels on the base having peripheral portions exposed to view at said front side of the base for registering a multi-digit number, a support member fixed to said base including a panel extending axially across said wheels, a plurality of parallel, open-ended light shields mounted at one end on said panel in approximate alignment with the spaces between the digit wheels, respectively, a plurality of light conducting rods having one end located in the open ends of said shields, respectively, the other ends of said rods extending into the spaces between the adjacent digit wheels, respectively, and terminating adjacent the peripheries of the wheels, said other ends of the rods having end faces presented to view at said front side of the base in positions corresponding to decimal point positions in the number registered by the wheels, means to secure said rods to said support, and a lamp within each shield for illuminating said end face of the adjacent rod.

6. A decimal indicator comprising a digital mechanical counter including a base having a front side and a plurality of coaxial, axially spaced digit wheels on the base having peripheral portions exposed to view at the front side of the base for registering a multi-digit number, a sheet metal support member fixed to the base and extending axially across said wheels, said member having a front edge adjacent said exposed peripheral portions of the digit wheels and a rear edge, there being a flange along said front edge of the member which extends toward said portions of the digit wheels and an upstanding panel along the rear edge of the member, a plurality of forwardly opening and extending light shields mounted at their rear ends on said panel in approximate alignment with the spaces between the digit wheels, said member having openings along said front edge in approximate alignment with said spaces, a light conducting rod extending through each opening, means to secure the rods to the member, the outer end of each rod being bent rearwardly at right angles and terminating opposite the open end of the adjacent light shield, the inner end of each rod extending between and terminating adjacent the peripheries of the adjacent digit wheels, said inner ends of the rods being bent forwardly and having end faces presented to view at said front side of the base in positions corresponding to different decimal point positions in the number registered by the wheels, a lamp within each shield to illuminate said end face of the adjacent rod, and light shielding arms integral with said flange and extending in front of said rods, respectively, each arm having an opening receiving said forwardly bent end of the adjacent rod.

7. A digital indicator comprising a digital mechanical counter including a base having a front side and coaxial digit wheels on the base having peripheral portions exposed to view at the front side of the base, a light conducting rod of rectangular cross section mounted on the base, said rod having a rectangular, forwardly facing end face located to the left of and adjacent the periphery of the left-hand digit wheels as the wheels are viewed from the front of the base, said face being arranged with its longer sides parallel to the axis of the wheels so as to simulate a minus sign, and a lamp located opposite the other end of the rod for illuminating said end face.

References Cited in the file of this patent

UNITED STATES PATENTS

| 2,351,814 | Holzner | June 20, 1944 |
| 2,358,425 | Tickell | Sept. 19, 1944 |
| 2,476,257 | Hoff | July 12, 1949 |
| 2,507,909 | Kaysen | May 16, 1950 |
| 2,549,512 | Neumann-Lezius et al. | Apr. 17, 1951 |
| 2,567,133 | Studley | Sept. 4, 1951 |
| 2,643,822 | Allen et al. | June 30, 1953 |

FOREIGN PATENTS

| 975,941 | France | Oct. 17, 1950 |